(12) United States Patent
Wang

(10) Patent No.: US 11,816,076 B2
(45) Date of Patent: Nov. 14, 2023

(54) DECLARATIVE DATA EVACUATION FOR DISTRIBUTED SYSTEMS

(71) Applicant: Salesforce, Inc., San Francisco, CA (US)

(72) Inventor: Xiaodan Wang, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 184 days.

(21) Appl. No.: 17/149,502

(22) Filed: Jan. 14, 2021

(65) Prior Publication Data

US 2022/0222228 A1 Jul. 14, 2022

(51) Int. Cl.
| | |
|---|---|
| G06F 7/00 | (2006.01) |
| G06F 17/00 | (2019.01) |
| G06F 16/21 | (2019.01) |
| G06F 16/23 | (2019.01) |

(52) U.S. Cl.
CPC ........ *G06F 16/214* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | |
|---|---|---|
| 9,268,605 B2 | 2/2016 | Wang et al. |
| 9,348,648 B2 | 5/2016 | Wang et al. |
| 9,529,626 B2 | 12/2016 | Wang et al. |
| 9,632,852 B2 | 4/2017 | Kwong et al. |
| 9,766,960 B2 | 9/2017 | Wang |
| 9,813,516 B2 | 11/2017 | Wang |
| 10,013,294 B2 | 7/2018 | Kwong et al. |
| 10,140,153 B2 | 11/2018 | Wang |
| 10,169,090 B2 | 1/2019 | Wang |
| 10,637,949 B2 | 4/2020 | Wang |
| 10,693,709 B2 | 6/2020 | Chainani et al. |
| 10,768,983 B2 | 9/2020 | Wang et al. |
| 10,776,147 B2 | 9/2020 | Ovesea et al. |
| 10,776,373 B2 | 9/2020 | Wang |
| 10,817,497 B2 | 10/2020 | Zaslavsky et al. |
| 2009/0037555 A1* | 2/2009 | Ueno ...................... G06F 3/067 709/213 |
| 2011/0040960 A1* | 2/2011 | Deierling .............. G06F 21/572 711/163 |
| 2014/0075017 A1 | 3/2014 | Wang et al. |
| 2015/0046279 A1 | 2/2015 | Wang |

(Continued)

FOREIGN PATENT DOCUMENTS

CA 2883883 C 9/2019

*Primary Examiner* — Tuan A Pham
(74) *Attorney, Agent, or Firm* — Polygon IP, LLP

(57) ABSTRACT

A request may be received to evacuate data from a database system associated with a designated computing pod that provides on-demand computing services to a plurality of entities via the internet. The data may include portions that each correspond with a respective one or more of the on-demand computing services. Data succession policies associated with the data may be identified, where each data succession policy corresponds with one of the data portions and identifies one or more constraints associated with evacuating the data portion. The data portions may be transmitted to recipient computing pods in accordance with the data succession policies, and removed from the database system.

17 Claims, 7 Drawing Sheets

(56) References Cited

U.S. PATENT DOCUMENTS

| | | | |
|---|---|---|---|
| 2015/0205531 A1* | 7/2015 | DeMattio | G06F 3/065 |
| | | | 711/114 |
| 2016/0119244 A1 | 4/2016 | Wang et al. | |
| 2016/0119246 A1 | 4/2016 | Wang | |
| 2018/0063271 A1 | 3/2018 | Wang | |
| 2019/0042595 A1* | 2/2019 | Basham | G06F 16/178 |
| 2019/0095249 A1 | 3/2019 | Wang | |
| 2019/0235895 A1 | 8/2019 | Ovesea et al. | |
| 2019/0235918 A1 | 8/2019 | Liu et al. | |
| 2019/0236150 A1* | 8/2019 | Zaslavsky | G06F 16/2308 |
| 2019/0236201 A1 | 8/2019 | Wang et al. | |
| 2019/0306008 A1 | 10/2019 | Chainani et al. | |
| 2020/0236060 A1 | 7/2020 | Wang | |

* cited by examiner

DECLARATIVE DATA EVACUATION FOR DISTRIBUTED SYSTEMS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to cloud computing systems and more specifically to data migration within cloud computing systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Cloud computing services are often provided by pods of computing devices working in concert. For instance, a pod may include a database server, a load balancer, application servers, and/or other such components. In some instances, a decision may be made to shut down a pod. For example, a single large pod may be decommissioned and replaced with multiple smaller pods.

BRIEF DESCRIPTION OF THE DRAWINGS

The included drawings are for illustrative purposes and serve only to provide examples of possible structures and operations for the disclosed inventive systems, apparatus, methods and computer program products for declarative data evacuation for distributed systems. These drawings in no way limit any changes in form and detail that may be made by one skilled in the art without departing from the spirit and scope of the disclosed implementations.

DETAILED DESCRIPTION

Figure 1:
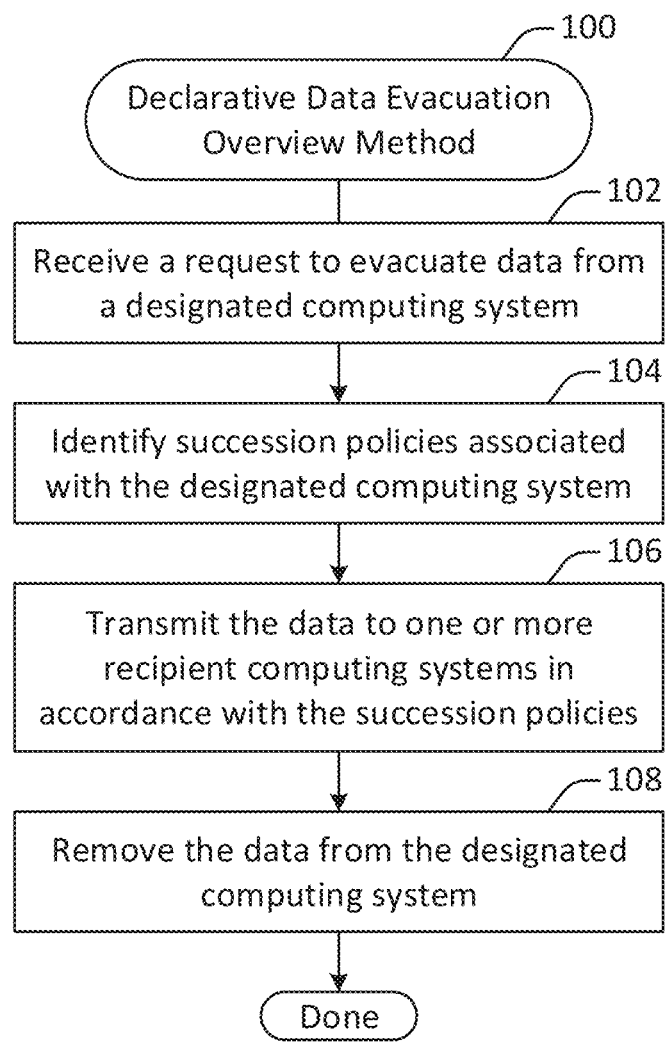
FIG. 1 illustrates an example of a declarative data evacuation overview method, performed in accordance with one or more embodiments.

Cloud computing services are often provided by pods of computing devices working in concert. For instance, a pod may include one or more database servers, load balancers, application servers, and/or other such components. In the event that some or all services within a pod or data center are permanently retired and shut down, the handling of data hosted across various data stores in accordance with conventional techniques is a messy and error-prone affair. Techniques and mechanisms described herein provide for a declarative, policy-based, automated approach for data succession.

As used herein, "data succession" refers to the handling and/or preservation of data belonging systems that are scheduled for retirement. Data succession is different from "data migration," which as used herein refers to the mechanism for extracting and transferring data from one system to another. In some implementations, data migration may be performed as part of the execution of the policies and plans generated as part of a data succession system.

Recent years have seen significant growth of cloud computing platforms. Increasingly, cloud computing platforms host thousands of instances across multiple continents and substrates. Given this growth, capacity and business objectives dictate that infrastructure adapt with increasing automation and efficiency. One type of operation performed in a cloud computing platform is shutting down or retiring a system, such as a computing pod. When such an operation occurs, the data hosted on retired systems needs to be preserved to ensure business continuity and minimize disruption to customers.

A decision to retire or shut down a system can be driven by any of a number of considerations. For example, business requirements may lead to the migration of infrastructure from one cloud vender to another, for instance in response to a strategic partnership with a specific vendor or a relative imbalance in infrastructure costs. As another example, customer demand may lead to shutting down a system, for instance if the number of customers in a geographic region declines.

As cloud computing services become increasingly distributed, capacity and business objectives dictate that systems will be retired at an increasing pace. However, when using conventional techniques, data succession remains a challenge because cloud computing platforms are exceedingly complex. This complexity makes it difficult to ensure that evacuating data from and shutting down a data store does not break application dependencies. For example, a data store may contain data from hundreds to thousands of different services, each with different data evacuation requirements.

In many cloud computing platforms, data succession is an afterthought, and is not part of the typical development process. As a result, even though cloud computing platforms may include conventional services built to migrate specific data between different systems, such conventional services typically exhibit numerous drawbacks. For example, application dependencies may prevent much of the data in a system from being migrated without disrupting customers or services that own such data. Accordingly, conventional techniques for data succession and evacuation typically involve brittle processes orchestrated by manually crafted scripts. Such scripts typically lack clear ownership and can easily conflict with one another or become outdated.

The increasing complexity of cloud computing services coupled with the manual nature of conventional data succession techniques often creates situations in which service performance may suffer during data succession. For example, service performance may suffer because a customer's data is no longer co-located in the same geographic region. As another example, functionality may be disrupted because a customer's data is no longer accessible by external integrations. As yet another example, data migration may violate one or more compliance obligations, for instance a requirement associated with the geographic location of data. According to various embodiments, techniques and mechanisms described herein may help to ensure that customers are not subject to such anomalous service disruptions.

According to various embodiments, techniques and mechanisms described herein provide for a declarative framework for defining the data succession policy of a service. Such a policy may be defined an any suitable time. For instance, a declarative policy may be specified early in the development process of the service, or may be instituted after the service has been in operation for some time.

According to various embodiments, a data succession policy may be translated into an evacuation plan. The evacuation plan may account for a number of considerations. For example, the evacuation plan may account for placement decisions, such as the identification of a destination for the data. As another example, the evacuation plan may account for transport decisions, such as when and how the data is copied.

In some implementations, the creation of the data evacuation plan may help to ensure that service is not disrupted. For example, the data evacuation plan may be created such that it does not break application dependencies. As another example, the data evacuation plan may be created in a manner that reduces or eliminates disruption to customer traffic, relative to conventional techniques.

In some embodiments, the data evacuation plan may be created in a way that respects one or more data evacuation requirements specified by a data evacuation policy. A data evacuation requirement may exhibit one or more characteristics. For example, the scope of a data evacuation requirement may indicate the data to which the requirement applies. As another example, a placement parameter may indicate one or more constraints on where data may be stored (e.g., geographically). As yet another example, a transform parameter may identify a coupling of the application to which the data relates to a local computing pod, data center, or other such infrastructure. As still another example, an application parameter may indicate a pattern of behavior of a service, for instance during evacuation, with respect to characteristics such as immutability and transactional consistency. By incorporating such requirements into the data evacuation plan, the evacuation of data may be tested and executed in a scalable and repeatable manner.

Consider the example of Alexandra, who is tasked with shutting down a large computing pod in a cloud computing platform. The computing pod includes data associated with hundreds of services and thousands of customers of the cloud computing platform. Each of these services and customers has different requirements about the interdependency, geographic storage location, and storage characteristics of its data. Many of these requirements are implicit, while others are recorded in various disparate and uncoordinated locations.

When using conventional techniques, Alexandra would need to manually identify these requirements, manually identify suitable destinations and migration techniques, manually compose an overall data succession plan, and then manually compose data migration scripts to execution the succession plan. This conventional approach is time-consuming, complex, and difficult to manage. Further, this conventional approach is likely to lead to unanticipated error conditions and migration problems, creating further work for Alexandra and service disruptions for customers.

In contrast to these conventional techniques, techniques and mechanisms described herein allow application developers, system administrators, customers, and other such individuals to specify declarative data succession policies that designate data succession policies in a standardized and accessible fashion. Accordingly, Alexandra may instruct the cloud computing platform to process these data succession policies in an automated fashion to produce a unified data succession plan for the computing pod. The cloud computing platform may then execute this unified data succession plan to migrate the data off of the computing pod in an efficient and orderly fashion.

According to various embodiments, one or more techniques are described herein with reference to relational databases. However, techniques and mechanisms described herein are broadly applicable to virtually any type of data store. For instance, techniques and mechanisms described herein may be applied to files in a blob store, entries in a key/value store, or other such data stores.

FIG. 1 illustrates an example of a declarative data evacuation overview method 100, performed in accordance with one or more embodiments. The method 100 may be performed at one or more computing systems within a cloud computing platform, Examples of such cloud computing systems are discussed throughout the application.

A request to evacuate data from a designated computing system is received at 100. According to various embodiments, the designated computing system may be a device or group of devices within a cloud computing platform. For instance, the designated computing system may be a computing pod that includes one or more application servers, messaging services, database systems, application servers, and/or other such components.

In some implementations, the request may be generated in part based on user input. For instance, a systems administrator may provide an instruction to shut down a pod. Alternatively, or additionally, the request may be generated in part based on an automated determination. For instance, the cloud computing platform may make a determination to retire a particular pod, for example when one or more designated retirement criteria are met.

One or more succession policies associated with the designated computing system are identified at 104. According to various embodiments, each succession policy may specify one or more data succession requirements. A data succession requirement may specify any suitable constraints or objectives related to data succession. For instance, a data succession requirement may specify when, where, or how data may be transmitted from the source computing system to one or more recipient computing systems.

The data is transmitted to one or more recipient computing systems at 106 in accordance with the succession policies. According to various embodiments, any suitable data transmission technique or mechanism may be used. The particular approach for transferring data may be strategically determined based on any of a number of contextual considerations. For instance, archival data may be transmitted in a different manner than data in a database system that is being actively used to provide on-demand computing services by a number of different customers.

The data is removed from the designated computing system at 108. In some implementations, the operation 108 may involve actively deleting data from a database system or other data storage system. Alternatively, or additionally, removing the data may involve one or more other operations for deprecating the data on the designated computing system.

Figure 2:
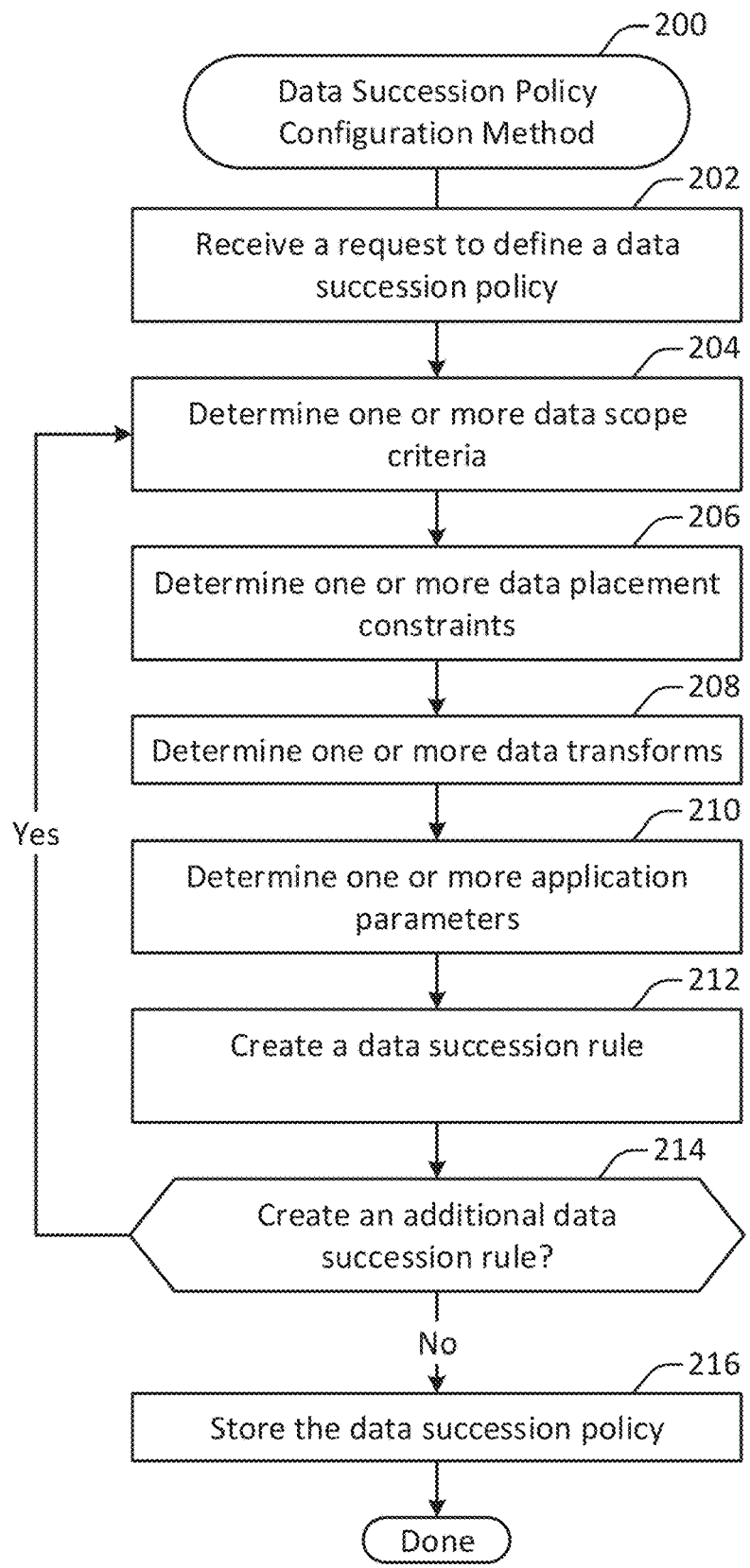
FIG. 2 illustrates an example of a method for configuring a data succession policy, performed in accordance with one or more embodiments.

FIG. 2 illustrates an example of a data succession policy configuration method 200, performed in accordance with one or more embodiments. The method 200 may be performed at one or more computing systems associated with a cloud computing platform. The systems may be in communication with one or more client devices.

A request to define a data succession policy is received at 202. According to various embodiments, the request to define the succession policy may be generated in an automated fashion. For instance, the request to define the succession policy may be generated as part of the development process for a service, as part of the onboarding of a new organization into the cloud computing platform, or some other such process.

In some implementations, the request to define the succession policy may be generated based on user input. For instance, a systems administrator, application developer, organization administrator, or other such individual may generate a request to define a succession policy for a service, organization, or other unit within the system.

In particular embodiments, a user may be forced to provide a data succession policy. For example, an application developer may be forced to provide a data succession policy for an application as part of the application development process. As another example, an administrator may be forced to provide a data succession policy for an organization as part of an onboarding process.

One or more data scope criteria are determined at 204. According to various embodiments, the term "scope" as used herein refers to the data governed by a data succession rule. For example, in the relational database context, a scope criterion may identify information such as one or more database tables, organizations (e.g., customers of the cloud computing platform), database table keys, database table key prefixes, and/or database row selection criteria. As another example, in the flat file context, a scope criterion may identify any suitable file retrieval parameters. Various types of criteria may be employed. For instance, the scope criteria may encompass all database rows in a particular database table and associated with a particular organization and modified within the most recent calendar month.

In particular embodiments, a multi-tenant database system may be employed. In such a system, tenanted data may be identified by a unique tenant identifier. Accordingly, scope criteria may encompass tenanted data such as data entered by a tenant, metrics capturing a tenant's usage, tenant audit data, or other such information. Alternatively, or additionally, scope criteria may encompass non-tenanted data that is not associated with a specific tenant, such as system configuration and/or other operational data.

One or more data placement constraints are determined at 206. According to various embodiments, placement constraints refer to constraints on the destination for data during data evacuation. For example, service owners may indicate that data associated with a service remain in a specific geographic region, data center, or cloud service provider due to data residency requirements. As another example, for tenanted data, service owners may indicate that the data should be co-located with the home system of the tenant. For instance, a tenant may be associated with a home computing pod. As yet another example, service owners may indicate that data should be discarded. For instance, data that may be discarded may include, but is not limited to, data that are derived and are re-generated on the destination system, data that includes configuration information specific to the local computing system, and data that includes transient metrics.

In some contexts, a particular data succession rule may not specify any placement criteria. When no placement constraints are specified, then the relevant data may be available for evacuation to any suitable location. For instance, audit data may need to be retained indefinitely due to compliance requirements but may be seldomly accessed and may not be specific to a particular tenant, region, or localized service.

One or more data transforms are determined at 208. According to various embodiments, a transform refers to one or more modifications that are to be applied to the data before, during, or after it is migrated to the new destination. For instance, a service may assign ownership for a set of rows to a specific pod. When the owning pod is retired, ownership should be transferred from the old pod to the new pod.

One or more application parameters are determined at 210. According to various embodiments, application parameters refer to application design decisions that affect when and/or how data is transported during data evacuation. Such parameters may be manifested as application patterns that are consistent across different applications, services, organizations, and other such units.

In some implementations, one example of an application pattern is immutability. When a data succession rule is specified as exhibiting immutability, data associated with the data succession rule is inserted and deleted but never updated. Accordingly, such data may need to be updated without any alteration. Also, such data can be copied to the recipient computing system without the risk of losing updates or data values becoming stale as a result of data modification performed on the source computing system.

In some embodiments, another example of an application rule is consistency. When a data succession rule is specified as exhibiting consistency, then the application expects data reads to be transactionally consistent. One such example is a message queue service in which the state of a single message may be spread across multiple physical tables such as a payload table, a deduplication signature table, and a message header table. In such a system, materializing a partial copy of the message on the destination system during data evacuation, for instance by transferring a message's payload without transferring its deduplication signature, may lead to anomalous behavior. Such data may need to be transmitted all at once, while both the corresponding services on both the source and recipient computing systems are deactivated.

According to various embodiments, scope placement, transform, and application policies can accommodate fine-grained control over evacuation decisions. For example, a message queue service may allow individual consumers to configure where a message should be processed. Such an approach may help to accommodate consumers that are tightly coupled to a specific data store instance. For instance, some messages may be suitable for moving to a variety of locations, while other messages may need to be processed on a geographically proximate destination pod.

According to various embodiments, scope, placement, transform, and application policies can accommodate fine-grained control over data transformation and manipulation. For instance, a service may couple its data to properties that are specific to a local pod. For example, a service may include the pod name as part of a key, or may reference the local administrative user in the data. In the event of data evacuation, these pod name and administrative user references may be updated via a suitable transform policy.

According to various embodiments, one or more of the criteria, constraints, transforms, and/or parameters discussed with respect to the operations 204-210 may be created based at least in part on user input. For instance, an administrator may provide such information.

In some implementations, one or more of the criteria, constraints, transforms, and/or parameters discussed with respect to the operations 204-210 may be created automatically. For example, an organization may be associated with a default data succession rule whose scope applies to all custom data associated with the organization. As another example, last-updated stamps in a database system may be automatically associated with a data transform to retain the data when the associated records are inserted into a new database system.

According to various embodiments, the criteria, constraints, transforms, and/or parameters discussed with respect to the operations 204-210 may allow data to be evacuated securely even in complex systems. For example, a combination of such criteria, constraints, transforms, and/or parameters may allow for the evacuation of data integrated with a data warehouse application external to the cloud computing system. As another example, combination of such criteria, constraints, transforms, and/or parameters may allow for the evacuation of data associated with a variety of compliance requirements.

A data succession rule is created at 212. In some embodiments, the data succession rule created at 212 may indicate that the data subject to the one or more data scope criteria determined at 204 should be placed in an alternate computing system selected according to the data placement constraints determined at 206 after applying the data transforms determined at 208 and in accordance with the application parameters determined at 210.

A determination is made at 214 as to whether to create an additional data succession rule. According to various embodiments, additional data succession rules may continue to be created until user input is received indicating that the process is to be terminated. Alternatively or additionally, one or more data succession rules may be created in an automated fashion.

The succession policy is stored at 216. According to various embodiments, the data succession rule may be stored in any suitable format such as, for instance, a JSON file. Examples of data succession policies, each with a single rule, stored in such a format are provided below.

Figure 3:
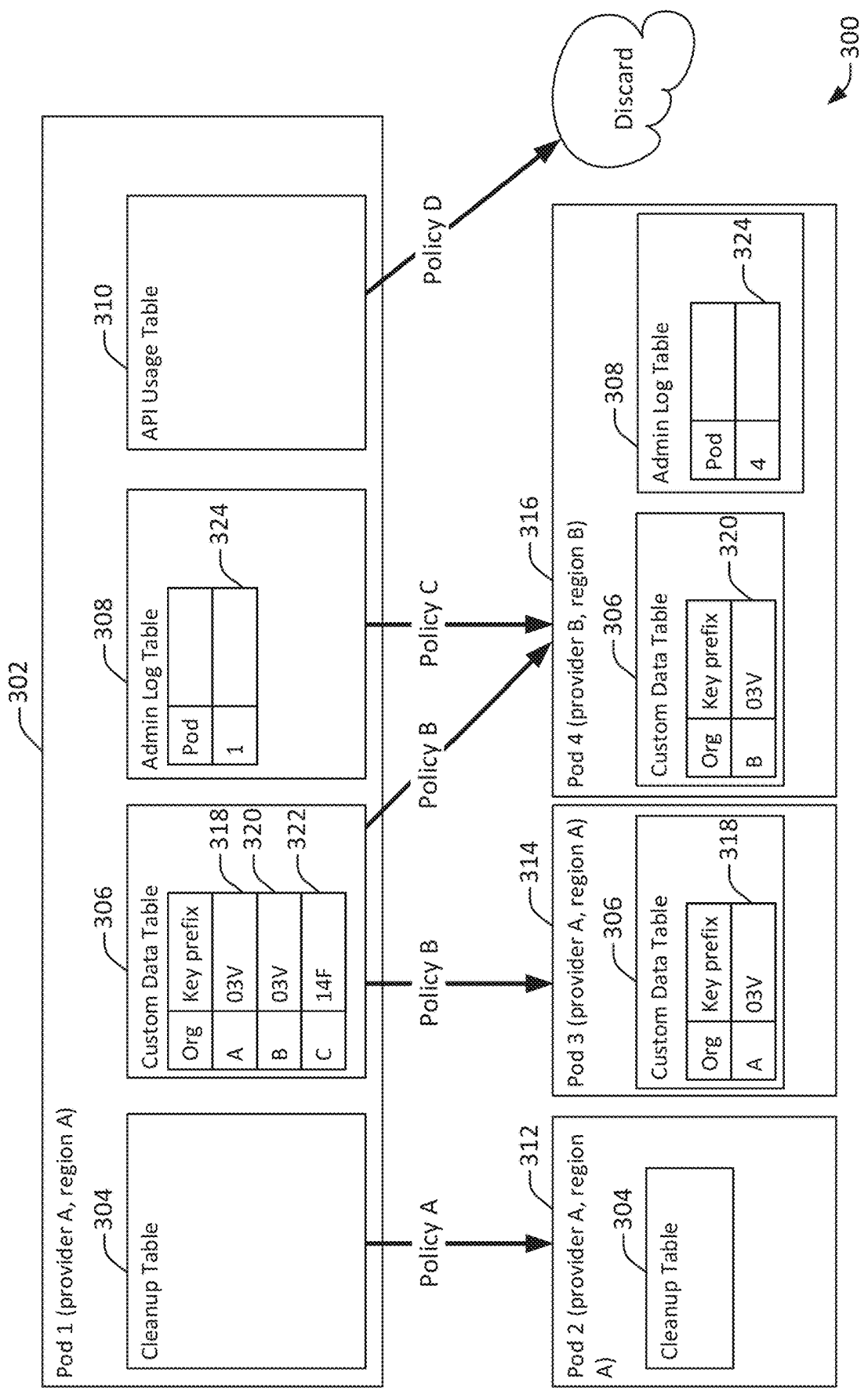
FIG. 3 illustrates an example of an arrangement of computing systems, configured in accordance with one or more embodiments.

FIG. 3 illustrates an example of an arrangement of computing systems 300, configured in accordance with one or more embodiments. The arrangement of computing systems 300 includes a pod 1 302, a pod 2 312, a pod 3 314, and a pod 4 316. This arrangement is provided in order to provide an example of the application of policies in accordance with techniques and mechanisms described herein. However, techniques and mechanisms described herein support a wide variety of arrangements of computing systems and data succession policies.

Policy A is an example of a data succession policy having a single data succession rule and configured in accordance with one or more embodiments. The scope of Policy A applies to the cleanup table 304, which is a table belong to a data deletion service. In the event of data evacuation, Policy A specifies that data from this table is to be migrated to another pod residing at the same cloud computing provider and located within the same region as the retired pod. Further, Policy A specifies that rows in the cleanup table 304 are mutable but do not need to be transactionally consistent with other data. Policy A is not associated with any transform.

In the example shown in FIG. 3, the cloud computing platform selects the pod 2 312 for receiving the data associated with the cleanup table 304. The pod 2 312 is located within the same region and cloud computing provider as the pod 1 302, and has sufficient excess capacity to accommodate the transfer. Accordingly, a copy of the cleanup table 304 is created within the pod 2 312, and the data associated with the cleanup table is transferred to the pod 2 312.

In some implementations, the Policy A may be specified as follows:

---
Data Succession Policy A

{ "name": "hbase cleanup tasks",
  "owner": "data deletion service",
  "tenanted": "no",
  "scope": [ {
    "table": "tenant_cleanup" } ],
  "placement": [ {
    "action": "copy",
    "substrate": "match",
    "region": "match" } ],
  "app_pattern": [ {
  "mutable": "yes",
  "consistent": "no" } ]}
---

Policy B is another example of a data succession policy having a single data succession rule and configured in accordance with one or more embodiments. The scope of policy B encompasses organizations A 318 and B 320 in the custom data table 306, which is a tenanted database table belonging to an integration service. The data governed by policy B are also identified by the key prefix 03V in this example. In the event of data evacuation, policy B specifies that the destination for the data encompassed by the scope is to be migrated to the new home pod of the tenant, Rows in this table are mutable and need to remain transactionally consistent with other data.

The custom data table 306 may include many columns other than those shown in FIG. 3, but only the columns related to the application of the data succession policy B are shown. In addition, each organization may be associated with potentially many rows of data, although FIG. 3 shows only one row for each organization for the purpose of illustration.

In the example shown in FIG. 3, the cloud computing platform selects the pod 3 314 for receiving the data associated with organization A 318 in the custom data table and the pod 4 316 for receiving the data associated with organization B 320 in the custom data table. Data in the custom data table associated with the organization C 14F is outside the scope of the policy B and therefore is ignored. The pods 3 314 and 4 316 are selected because these are the new pods associated with the organizations A 318 and B 320. To effectuate the move, the custom data table 306 is recreated within each of the two pods, and the data associated with the organizations is copied to the new table.

In some implementations, the Policy B may be specified as follows:

---
Data Succession Policy B
---
{ "name": "external integrations",
  "owner": "integration service",
  "tenanted": "yes",
  "scope": [ {
     "table": "custom_data",
     "keyprefix": "03v" } ],
  "placement": [ {
     "action": "copy",
     "pod": "tenant" } ],
  "app_pattern": [ {
     "mutable": "yes",
     "consistent": "yes" } ]}
---

Policy C is another example of a data succession policy having a single data succession rule and configured in accordance with one or more embodiments. The scope of policy C encompasses the admin log table 308, which belongs to the administration service. The policy C does not include any placement constraints, so data from this table can be migrated to any location during evacuation. However, the transform policy states that the value of the pod column must be updated to the pod name of the destination system. Rows in this table are also immutable and do not need to remain transactionally consistent with other data.

In the example shown in FIG. 3, the cloud computing platform selects the pod 4 316 for receiving the data associated with the admin log table 308. To effect the migration, the admin log table 308 is copied to the pod 4 316. As part of the migration, the pod column in the admin log table is updated to reflect the new pod value.

In some implementations the Policy C may be specified as follows:

---
Data Succession Policy C
---
{ "name": "admin audit logs",
  "owner": "administration service",
  "tenanted": "no",
  "scope": [ {
     "table": "admin_log" } ],
  "placement": [ {
     "action": "copy" } ],
  "transform": [ {
     "owning_pod": [ {
        "field": "pod",
        "value": "DEST_POD" } ] } ],
  "app_pattern": [ {
     "mutable": "no",
     "consistent": "no" } ]}
---

Policy D is another example of a data succession policy having a single data succession rule and configured in accordance with one or more embodiments. The scope of policy D encompasses the API usage table 310, which belongs to the API service. The policy D indicates that the transient usage data can be safely discarded in the event of data evacuation.

In some implementations, the Policy D may be specified as follows:

---
Data Succession Policy D
---
{ "name": "api usage metric",
  "owner": "api service",
  "tenanted": "yes",
  "scope": [ {
     "table": "api_usage" } ],
  "placement": [ {
     "action": "drop" } ] }
---

For the purpose of illustration, each of the data succession policies discussed above include only a single rule. However, a data succession policy for a service, organization, or other data unit may potentially encompass many such rules.

Figure 4:
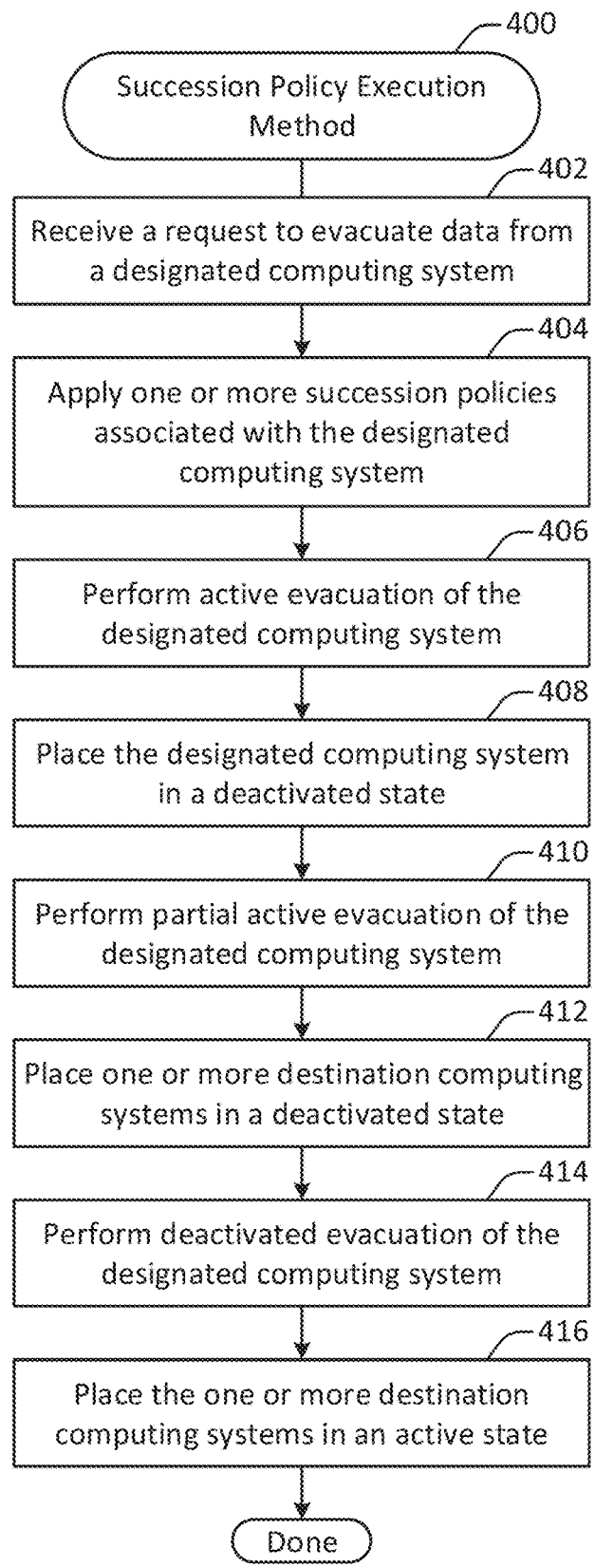
FIG. 4 illustrates an example of a method for executing a succession policy, performed in accordance with one or more embodiments.

FIG. 4 illustrates an example of a method 400 for executing a succession policy, performed in accordance with one or more embodiments. The method 400 may be performed at one or more computing systems within a cloud computing platform. The method 400 may be performed to execute a policy such as the policies discussed with respect to FIGS. 2 and 3.

A request to evacuate data from a designated computing system is received at 402. In some implementations, the request may be generated based on user input. For instance, a systems administrator may provide a request to shut down a computing pod in an on-demand computing services environment. Alternatively, or additionally, the request may be generated automatically. For instance, the system may automatically shut down a computing pod at a scheduled time or when one or more criteria are met.

One or more succession policies associated with the designated computing system are applied at 404, According to various embodiments, applying the one or more succession policies may involve identifying any policies associated with data stored on the designated computing system, Based on these policies, one or more operations may be performed in order to prepare for data migration. For example, the identified policies may be analyzed to identify data that is encompassed within the scope of the various policies. As another example, a determination may be made about how and when to migrate particular data elements. Criteria for making such a determination are discussed in more detail below. As yet another example, a destination location may be identified for data that is encompassed within the scope of the various data succession policies.

In some implementations, identifying a destination computing system for data that is encompassed in a data succession policy rule may involve selecting a destination that complies with a placement constraint parameter. Alternatively, or additionally, one or more placement heuristics may be applied. For example, a destination location may be selected based on excess processing, storage, or other computing capacity at the destination location. As another example, a destination location may be selected based on geographic proximity to the source location. As yet another example, a destination location may be selected based on proximity within the same cloud computing service provider.

Active evacuation of the designated computing system is performed at 406. In some implementations, the active evacuation phase of data succession process may involve transferring data while both the designated computing system and the destination computing system for a given data element are both actively continuing operations. In some configurations, even operations pertaining to the data being transferred may continue.

According to various embodiments, transferring data during an active evacuation phase allows downtime to be reduced, since neither the source nor the destination system needs to be shut down in order to transfer the data. In some configurations, data may be transferred during an active evacuation phase when it is immutable and when transactional consistency is not required. However, the particular requirements for transferring data during the active phase may be strategically determined based on, for instance, the available data succession policy parameters.

In the example shown in FIG. 3, the policy C may be executed during the active phase to transfer the admin log table 308 to the pod 4 316. This data may be transferred during the active phase because the table is declared to be immutable and does not expect transactional consistency. Thus, its rows can be safely copied during the active phase while both source and destination pods are actively serving customer traffic and modifying the database, During this phase, data migration may involve acquiring an exclusive lock on the admin log table 308 in the source pod, transferring the relevant row to the destination pod, and deleting the row on the source pod.

The designated computing system is placed in a deactivated state at 408. According to various embodiments, placing the designated computing system in a deactivated state may involve shutting down services on the computing system. For instance, in the example shown in FIG. 3, the pod 302 may stop accepting requests for computing services.

Partial active evacuation of the designated system is performed at 410. In some implementations, the partial active evacuation of the designated computing system may involve the transfer of data from the designated system after the designated computing system has been deactivated from providing services. However, the destination computing systems may continue to actively serve traffic while data is being evacuated from the designated (i.e., source) computing system.

According to various embodiments, shutting down the designated system during the transfer of some data may help to ensure that data is not modified while it is being evacuated. For example, data may be evacuated during the partial active phase when it is mutable but when transactional consistency is not required. This is because the destination computing system remains active and therefore may observe data values that are not transactionally consistent while the data is being migrated. However, such behavior may be explicitly declared safe as part of a data succession policy.

In the example shown in FIG. 3, the policy A may be executed during the partial active phase. The policy A specifies that the cleanup table is mutable, but that transactional consistency is not required. During the partial active phase in this example, data migration may involve acquiring an exclusive lock on the cleanup table 304 in the source pod 1 302, transferring the relevant row to the destination pod 2 312, and deleting the row on the source pod.

According to various embodiments, customer downtime during data evacuation may be further reduced by leveraging change data capture to start copying rows for mutable data during the active phase, thereby reducing the time spent in the partial active phase. For instances, the system can start copying mutable data to the destination pod, and then keep the copy in sync with the source pod by propagating new changes (e.g., inserts, updates, deletes) from the source pod. The corresponding rows on the source pod may then be deleted during the partial active phase.

One or more destination computing systems are placed in a deactivated state at 412. In some implementations, placing one or more destination systems in a deactivated state may involve transmitting a message to those computing systems instructing them to deactivate.

Deactivated evacuation of the designated computing system is performed at 414. According to various embodiments, shutting down both the source system and the destination system may help to ensure that data is neither modified nor relied upon during the migration period. For example, data may be evacuated during the deactivated state when it is mutable and when transactional consistency is required.

In the example shown in FIG. 3, the data associated with the Policy B is mutable and subject to transactional consistency. Accordingly, such data is transferred between the custom data table 306 and the new custom data tables in the pod 3 314 and the pod 4 316 when the corresponding services are shut down on all three pods.

According to various embodiments, data that is identified for discarding may be actively deleted at any suitable time. Alternatively, such data may be left in place and removed when the computing system is shut down.

The one or more destination computing systems are placed in an active state at 416. In some implementations, placing one or more destination systems in an activated state may involve transmitting a message to those computing systems instructing them to activate.

According to various embodiments, one or more of the operations shown in FIG. 4 may be performed in an order different than that shown. For instance, a computing system may be in an active migration status for one service, a deactivated migration status for another service, and a partial active migration status for a third service.

It is important to note that placing a computing system in a deactivated state does not imply that the computing system is entirely shut down. As discussed herein data may be transferred to and from systems placed in a deactivated state. In addition, a computing system may continue to provide one or more computing services that do not pertain to the data being transferred.

In particular embodiments, any or all of the operations described with respect to FIG. 4 may be performed in a testing configuration. Codifying data evacuation in declarative policies allows testing to be both automated and repeatable. Consider, for example, the policy A discussed with respect to the FIG. 3, Setup and validation tasks may be injected during any or all of the active, partial active, or deactivated transfer phases. For instance, during the active phase, rows can be created on the source pod. Then the system can validate that all rows remain on the source pod at the end of the active phase. Next, at the end of the partial active phase, the service may validate that a subset of the rows in the cleanup table 304 have been migrated to and is accessible from the pod 2 312, The service may also validate that the pod 2 312 is located within the region A and is associated with the cloud service provider A. Finally, at the end of the deactivated phase, the service can validate that no rows of the cleanup table 304 remain on the source pod.

According to various embodiments, testing and validation may involve any or all of a variety of operations. For example, test data may be created, copied, and/or deleted. As another example, determinations that data is present, available, absent, or unavailable may be performed. As yet another example, characteristics of computing systems, such as geographic location, may be evaluated and verified. The particular operations performed may be strategically determined by, for instance, those responsible for particular services or organizations within the on-demand computing services environment.

Figure 5:
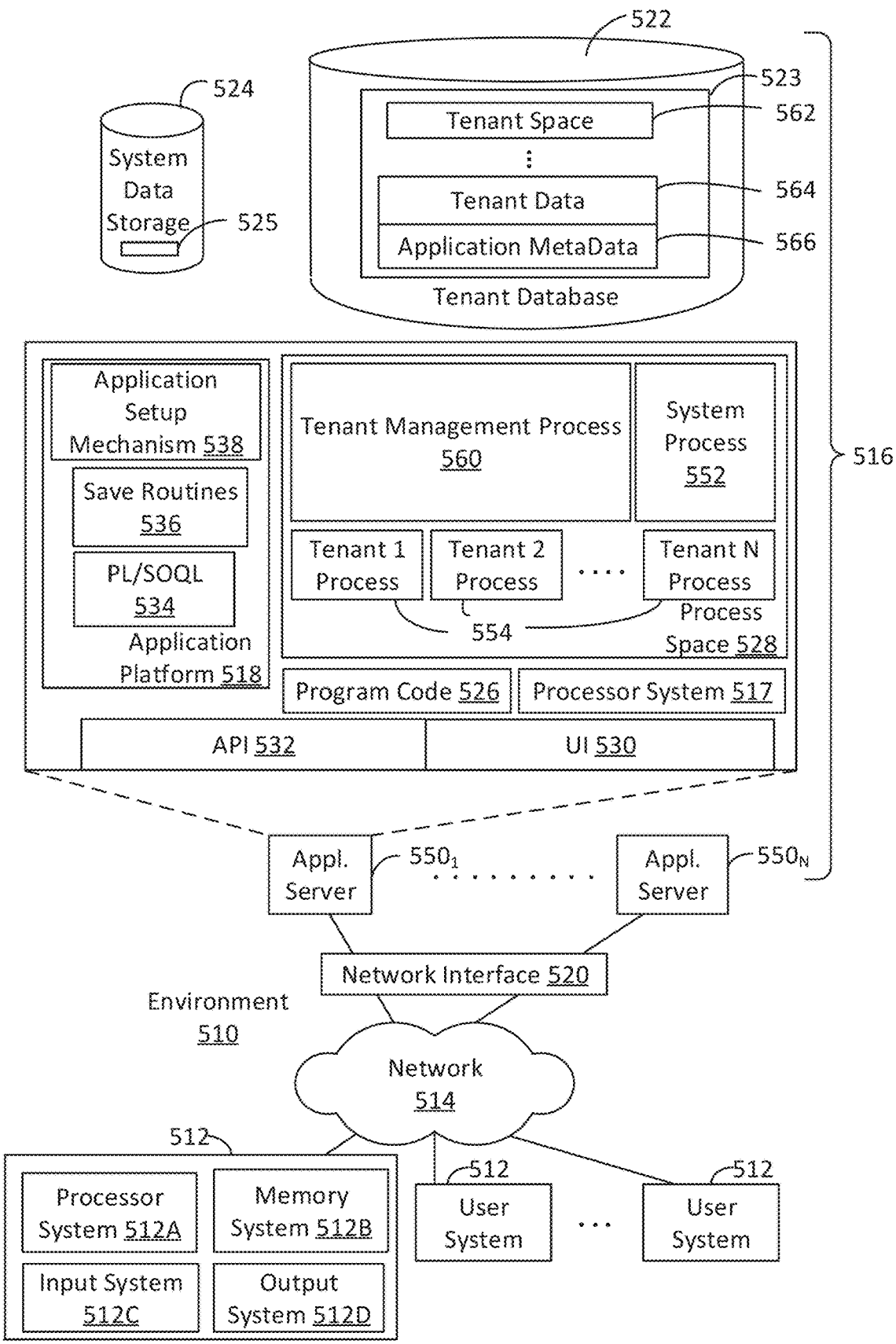
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512 network 514 database system 516 processor system 517, application platform 518, network interface 520, tenant data storage 522, tenant data 523, system data storage 524, system data 525, program code 526, process space 528, User Interface (UI) 530, Application Program Interface (API) 532, PL/SOQL. 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider, Some services may store information from one or more tenants into tables of a common database image to form a multi-tenant database system (MIS), As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516, Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRI) items for an entire tenant organization may be stored to tenant storage space 562. A UI 530 provides a user interface and an API 532 provides an application programming interface to system 516 resident processes to users and/or developers at user systems 512.

System 516 may implement a web-based data succession system. For example, in some implementations, system 516 may include application servers configured to implement and execute data succession software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a data succession system, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MIS arrangement. By way of example, one tenant organization may be a company that employs a sales force where each salesperson uses system 516 to manage their sales process. Thus, a user in such an organization may maintain contact data, leads data, customer follow-up data performance data, goals and progress data etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
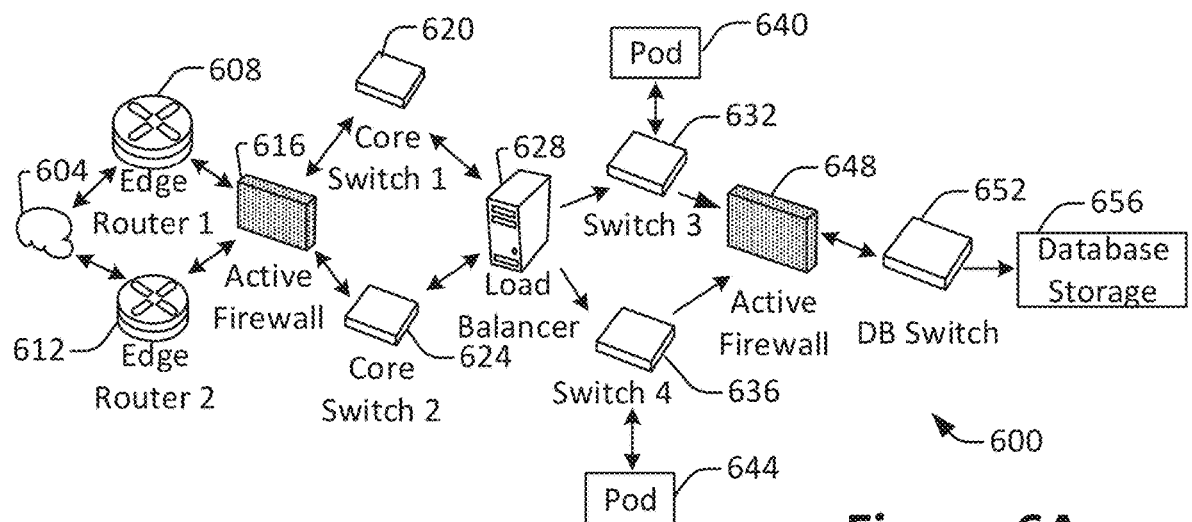
FIG. 6A shows a system diagram of an example of architectural components of an on-demand database service environment, configured in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process data succession information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
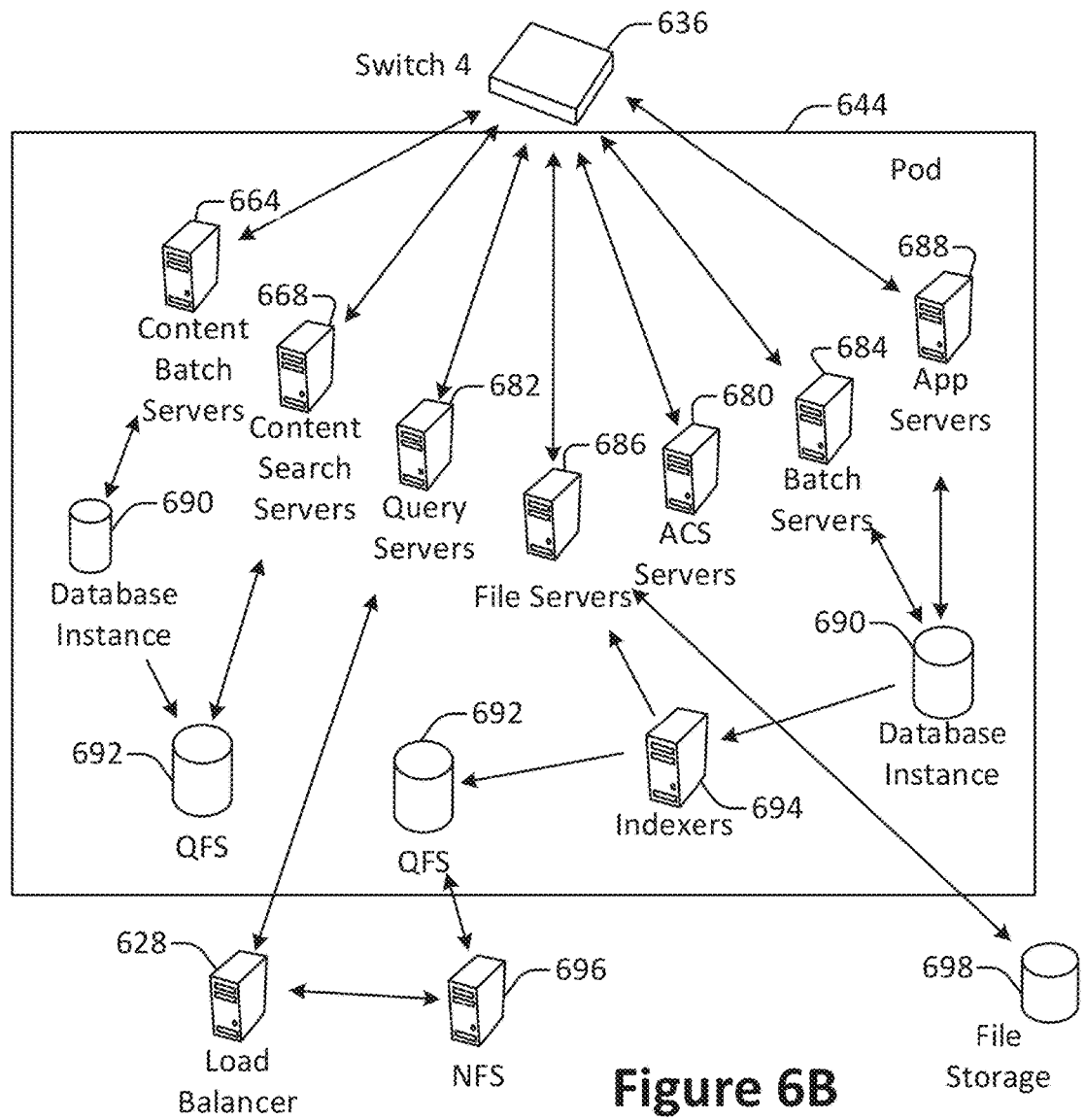
FIG. 6B shows a system diagram further illustrating an example of architectural components of an on-demand database service environment, in accordance with some implementations.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668 query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628 which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
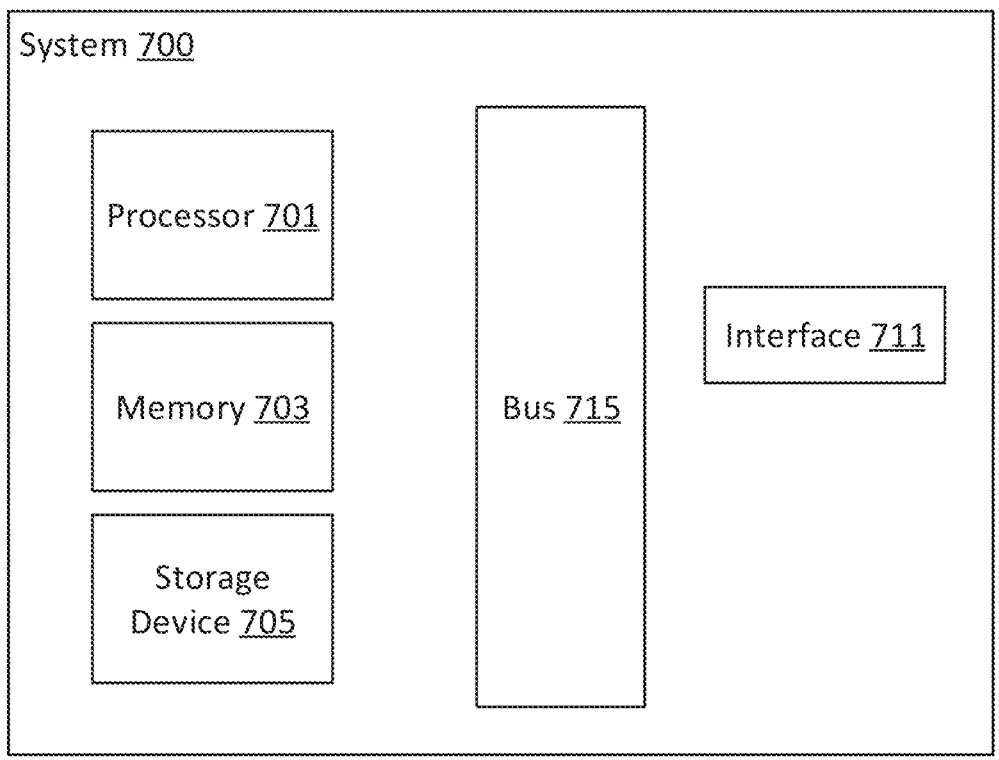
FIG. 7 illustrates one example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network.

Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
    receiving a request to evacuate data from a database system associated with a designated computing pod providing on-demand computing services to a plurality of entities via the internet, the data including a plurality of data portions, one or more of the data portions corresponding with a respective one or more of the on-demand computing services;
    identifying a plurality of data succession policies associated with the data, the data succession policies corresponding with a respective one or more of the plurality of data portions and identifying one or more constraints associated with evacuating the respective one or more data portions;
    transmitting the data portions to a respective recipient computing pod, a first subset of the data portions being transmitted in an active phase in which both the designated computing pod and the respective recipient computing pod continue to provide on-demand computing services related to the first subset of the data portions, a second subset of the data portions being transmitted in a deactivated phase in which neither the designated computing pod nor the respective recipient computing pod continue to provide on-demand computing services related to the second subset of the data portion, and a third subset of the data portions being transmitted in a partial active phase in which the designated computing pod no longer provides on-demand computing services related to the third subset of the data portions and in which the respective recipient computing pod continues to provide on-demand computing services related to the third subset of the data portions, the first, second, and third subsets being selected based on the plurality of data succession policies; and
    removing the data from the database system.

2. The method recited in claim 1, wherein each of the first subset of the data portions is immutable, and wherein transactional consistency is not required for each of the first subset of the data portions.

3. The method recited in claim 1, wherein each of the first subset of the data portions is mutable, and wherein transactional consistency is not required for each of the third subset of the data portions.

4. The method recited in claim 1, wherein each of the first subset of the data portions is mutable, and wherein transactional consistency is required for each of the second subset of the data portions.

5. The method recited in claim 1, wherein a designated one of the constraints identifies a geographic region in which a designated one of the data portions is permitted to be located.

6. The method recited in claim 1, wherein a designated one of the constraints specifies whether a designated one of the data portions may be altered after being created.

7. The method recited in claim 1, wherein a designated one of the constraints specifies whether transactional consistency between a first one of the data portions and a second one of the data portions must be maintained.

8. The method recited in claim 1, wherein a designated one of the data succession policies is associated with a data transform that provides an instruction for altering the respective data portion before transmitting the respective data portion to the respective recipient computing pod.

9. The method recited in claim 1, wherein a designated one of the data succession policies includes a designated scope criterion, the designated scope criterion identifying the respective data portion corresponding with the designated succession policy.

10. The method recited in claim 9, wherein the designated scope criterion identifies one or more of the on-demand computing services.

11. The method recited in claim 9, wherein the designated scope criterion identifies one or more database tables.

12. The method recited in claim 9, wherein the designated scope criterion identifies one or more files in a file data store.

13. The method recited in claim 9, wherein the designated scope criterion identifies one or more of the entities.

14. The method recited in claim 13, wherein the database system is a multitenant database system, and wherein each of the entities is a tenant in the multitenant database system.

15. One or more non-transitory computer-readable media having instructions stored thereon for performing a method, the method comprising:
    receiving a request to evacuate data from a database system associated with a designated computing pod providing on-demand computing services to a plurality of entities via the internet, the data including a plurality of data portions, one or more of the data portions corresponding with a respective one or more of the on-demand computing services;
    identifying a plurality of data succession policies associated with the data, the data succession policies corresponding with a respective one or more of the plurality of data portions and identifying one or more constraints associated with evacuating the respective one or more data portions;
    transmitting the data portions to a respective recipient computing pod, a first subset of the data portions being transmitted in an active phase in which both the designated computing pod and the respective recipient computing pod continue to provide on-demand computing services related to the first subset of the data portions, a second subset of the data portions being transmitted in a deactivated phase in which neither the designated computing pod nor the respective recipient computing pod continue to provide on-demand computing services related to the second subset of the data portion, and a third subset of the data portions being transmitted in a partial active phase in which the designated computing pod no longer provides on-demand computing services related to the third subset of the data portions and in which the respective recipient computing pod continues to provide on-demand computing services related to the third subset of the data portions, the first, second, and third subsets being selected based on the plurality of data succession policies; and
    removing the data from the database system.

16. The one or more non-transitory computer-readable media recited in claim 15, wherein each of the first subset of the data portions is immutable, and wherein transactional consistency is not required for each of the first subset of the data portions.

17. A computing system comprising:
    a communication interface operable to receive a request to evacuate data from a database system associated with a designated computing pod providing on-demand computing services to a plurality of entities via the internet, the data including a plurality of data portions, one or more of the data portions corresponding with a respective one or more of the on-demand computing services;

a processor operable to identify a plurality of data succession policies associated with the data, the data succession policies corresponding with a respective one or more of the plurality of data portions and identifying one or more constraints associated with evacuating the respective one or more data portions; and a communication interface operable to transmit the data portions to a respective recipient computing pod, a first subset of the data portions being transmitted in an active phase in which both the designated computing pod and the respective recipient computing pod continue to provide on-demand computing services related to the first subset of the data portions, a second subset of the data portions being transmitted in a deactivated phase in which neither the designated computing pod nor the respective recipient computing pod continue to provide on-demand computing services related to the second subset of the data portion, and a third subset of the data portions being transmitted in a partial active phase in which the designated computing pod no longer provides on-demand computing services related to the third subset of the data portions and in which the respective recipient computing pod continues to provide on-demand computing services related to the third subset of the data portions, the first, second, and third subsets being selected based on the plurality of data succession policies, wherein the database system is operable to remove the data.

* * * * *